United States Patent
Ouellette

(10) Patent No.: US 7,051,510 B2
(45) Date of Patent: May 30, 2006

(54) METHOD OF OPERATING A PULSEJET

(75) Inventor: Richard P. Ouellette, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 10/831,498

(22) Filed: Apr. 23, 2004

(65) Prior Publication Data

US 2005/0097897 A1 May 12, 2005

Related U.S. Application Data

(62) Division of application No. 10/245,519, filed on Sep. 16, 2002.

(51) Int. Cl.
 *F02K 7/075* (2006.01)
(52) U.S. Cl. ....................................... 60/204
(58) Field of Classification Search ............... 60/39.76, 60/39.77, 39.79, 39.8, 204, 247, 248, 249
See application file for complete search history.

(56) References Cited

U.S. PATENT DOCUMENTS

| | | | |
|---|---|---|---|
| 1,969,753 A | 8/1934 | Holzwarth |
| 2,602,291 A | 7/1952 | Farnell |
| 2,605,109 A | 7/1952 | Myers |
| 2,635,421 A | 4/1953 | Blum |
| 2,948,113 A | 8/1960 | Miller |
| 2,950,592 A | 8/1960 | Frank |
| 3,263,418 A | 8/1966 | Lange et al. |
| 3,462,955 A | 8/1969 | Graber et al. |
| 4,254,617 A | 3/1981 | Papsdorf |
| 4,645,448 A | 2/1987 | Otto et al. |
| 4,881,373 A | 11/1989 | Yamaguchi et al. |
| 4,926,818 A | 5/1990 | Oppenheim et al. |
| 5,249,952 A | 10/1993 | West et al. |
| 6,112,513 A | 9/2000 | Catt et al. |
| 6,308,898 B1 | 10/2001 | Dorris, III et al. |

*Primary Examiner*—Michael Koczo, Jr.
(74) *Attorney, Agent, or Firm*—Harness Dickey & Pierce P.L.C.

(57) ABSTRACT

A pulsejet system and method requires no pulsejet internal moving parts. Each pulsejet includes a combustion chamber having an upstream inlet port joined to an inlet diffuser, boundary layer air ports enveloping the combustion chamber, and a downstream exit port joined to a discharge nozzle. Each pulsejet discharges into an ejector to increase net thrust. Each ejector includes an augmentor cell having side walls and perforated end plates. The perforated end plate between each pair of pulsejets is shared to permit the discharge thrust to equalize across the pulsejet group. Air and fuel mix in the combustion chamber and are detonated by a reflected back-pressure wave. Detonation/deflagration reverse pressure waves compressing boundary layer air flow act as a pneumatic throat to temporarily choke off inlet fresh air at the upstream inlet port. The pneumatic throat replaces the conventional mechanical valve used for this purpose.

20 Claims, 8 Drawing Sheets

METHOD OF OPERATING A PULSEJET

CROSS-REFERENCE TO RELATED APPLICATIONS

This application is a divisional of U.S. patent application Ser. No. 10/245,519 filed on Sep. 16, 2002, presently pending, the disclosure of which is incorporated herein by reference.

FIELD OF THE INVENTION

The present invention relates to pulsejets and more specifically to a pneumatically controlled pulsejet coupled with an ejector providing increased thrust.

BACKGROUND OF THE INVENTION

Pulsejets provide an inexpensive means to propel an aircraft or other propulsion device. Pulsejets as known in the art are extraordinarily simple devices, generally having only one moving part in the engine (a "mechanical" type air inlet valve). The main disadvantages of known pulsejet designs are a low propulsion efficiency and a limited mechanical durability due to the life expectancy of the air valve used in the engine. Pulsejet engine designs are therefore not commonly used as the main engines (i.e., the engine normally used for axial propulsion) of an aircraft.

In order to improve the thrust capability of a pulsejet engine, thrust augmentors, well known in the art, are often employed. By adding a thrust augmentor to the discharge side of a pulsejet engine, the thrust from the pulsejet engine can be increased by a factor ranging from approximately 1.5 to approximately 4.0. The drawback of known thrust augmentors is that the thrust augmentor itself is a separate structure added onto the pulsejet which increases the overall weight and air drag of the engine/augmentor combination. Because of the air inlet mechanical valve design, however, an augmented pulsejet engine is still not a good choice for the main propulsion engine of an aircraft due to its limited endurance, and propulsion inefficiency in applications where limited engine quantity is a design condition.

The air valve typically used on known pulsejet designs is a "mechanical" valve. The mechanical valve is typically located in the air inlet of a pulsejet engine and operates by deflecting to a minimum aperture size to allow air into the pulsejet engine. When a detonation of a fuel/air mixture occurs in the pulsejet engine, a backpressure wave from the detonation closes the mechanical valve, temporarily shutting off the air inlet to the pulsejet engine. Many mechanical valve designs known in the art suffer from a frequent mechanical failure rate and often fail from fatigue of the metal components used. The mechanical valve therefore becomes a limiting factor in the design life of a pulsejet engine, and therefore has reduced the application of pulsejet engines.

The prior art also includes pulsejet engines with acoustic valves or valve-less designs. These designs, however, do not restrict engine combustion products from traversing back through the inlet. This backflow creates a loss in thrust unless (as in the case of a Hiller-Lockwood type pulsejet reactor) the inlet is pointed aft to provide thrust. The acoustic inlets suffer from severe performance losses. The reactors suffer from poor volumetric and integration considerations.

A need therefore exists for a pulsejet engine which reduces the maintenance and failure rate of existing designs due to the mechanical valve, and for an improved overall pulsejet/augmentor design to increase the potential uses of this otherwise simple engine type.

SUMMARY OF THE INVENTION

In a preferred embodiment of the present invention a pulsejet engine with no mechanical valve, and therefore no engine moving parts, is provided. Each pulsejet engine includes a combustion chamber having an upstream inlet port joined to an inlet diffuser. A plurality of boundary air plenums having boundary layer air ports envelope the combustion chamber and are positioned to inject boundary layer air into the combustion chamber. A downstream combustion chamber exit port is joined to a discharge nozzle. An ejector is structurally combined with each pulsejet which by directing pulsejet effluent entrains ambient air and increases the net thrust of the pulsejet engine. Two or more pulsejets and ejectors of the present invention when arranged in one or more groups of pulsejets provide a reliable propulsion source.

In operation of the invention, fresh air enters the inlet diffuser of the pulsejet at an inlet throat. Boundary layer air is directed into the boundary layer air ports enveloping the combustion chamber. Fuel is injected forward of the combustion chamber in the inlet diffuser, or within the combustion chamber via a fuel injection system, and combines with the air into a fuel/air mixture in the combustion chamber. The fuel/air mixture is detonated by reflected pressure waves from a previous cycle of operation of the pulsejet. The detonation produces reverse pressure waves which force boundary layer air to localize about the inlet throat. This temporarily chokes off the fresh air and the fuel supply at the upstream inlet port of the combustion chamber forcing all of the pressurized effluent to exit the rear of the pulsejet as thrust. The reverse pressure waves used to temporarily choke off the inlet air and fuel supply eliminate the need for the mechanical valves now used for this purpose. By eliminating the mechanical valve, a pulsejet with no moving engine parts results.

In one preferred embodiment, each ejector includes an augmentor cell. The augmentor cell includes side walls, potentially perforated end plates and inlet and exhaust apertures. The pulsejets are grouped into pairs of pulsejets and the perforated end plates of the augmentor cell between pairs of pulsejets is shared which permits the discharge thrust from the pairs of pulsejets to equalize across the perforated end plates. Equalizing the discharge thrust permits the overall group of pulsejets to operate at an evenly distributed thrust level.

In another preferred embodiment, at least one moveable cowl is provided on at least one of the inlet and exhaust apertures. The movable cowl has several uses. Movable cowls are used to reduce the exhaust aperture size of one or more augmentor cells which provides improved control of the thrust from each pulsejet or pulsejet group. Movable cowls also isolate the inlet and exhaust apertures of the augmentor cells to protect the pulsejet engines within the augmentor cells when the pulsejet engines are not in use.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
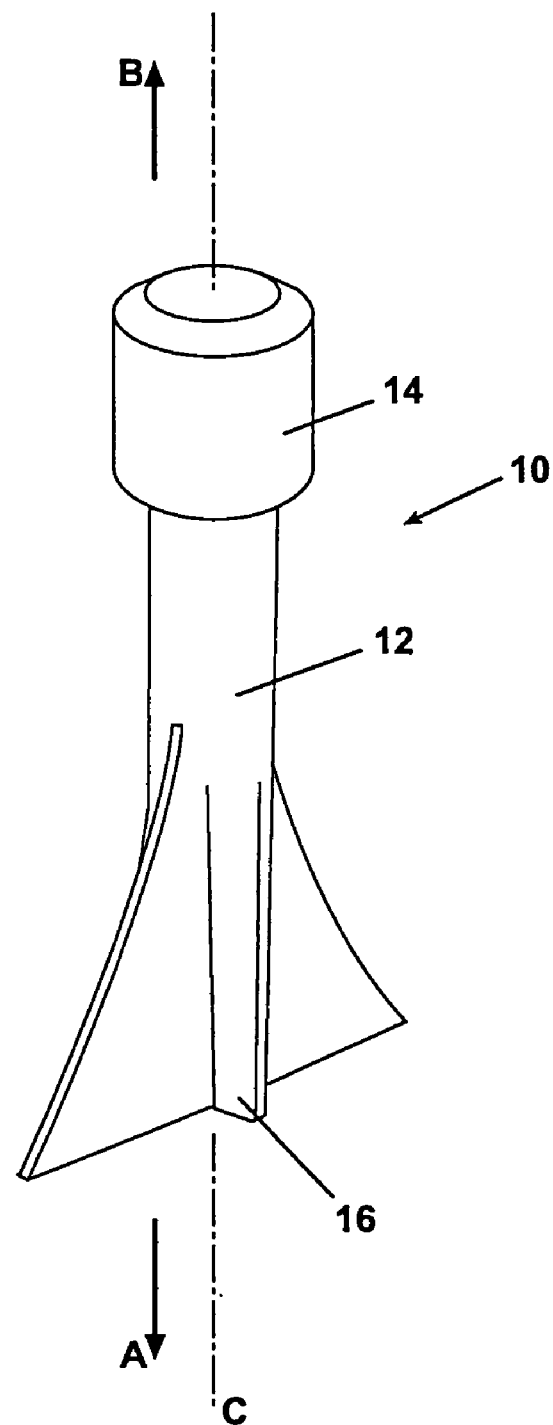
FIG. 1 is a side elevation view of a preferred embodiment of a pulsejet engine of the present invention.

Referring to FIG. 1, a pulsejet engine 10 in accordance with a preferred embodiment of the present invention is shown. The pulsejet engine 10 includes a body 12 having an inlet end 14 and an exhaust end 16. Propulsion thrust from the pulsejet engine 10 discharges from an exhaust end 16 in a propulsion exhaust direction A. Air, normally at atmospheric pressure, enters the inlet end 14. The air mixes with a fuel (discussed in reference to FIG. 11) which is detonated to produce thrust to propel a platform (not shown) in a platform travel direction B. In the exemplary preferred embodiment shown, both the air flow and the burned fuel/air mixture travel in the propulsion exhaust direction A approximately parallel with a pulsejet engine longitudinal centerline C.

Figure 2:
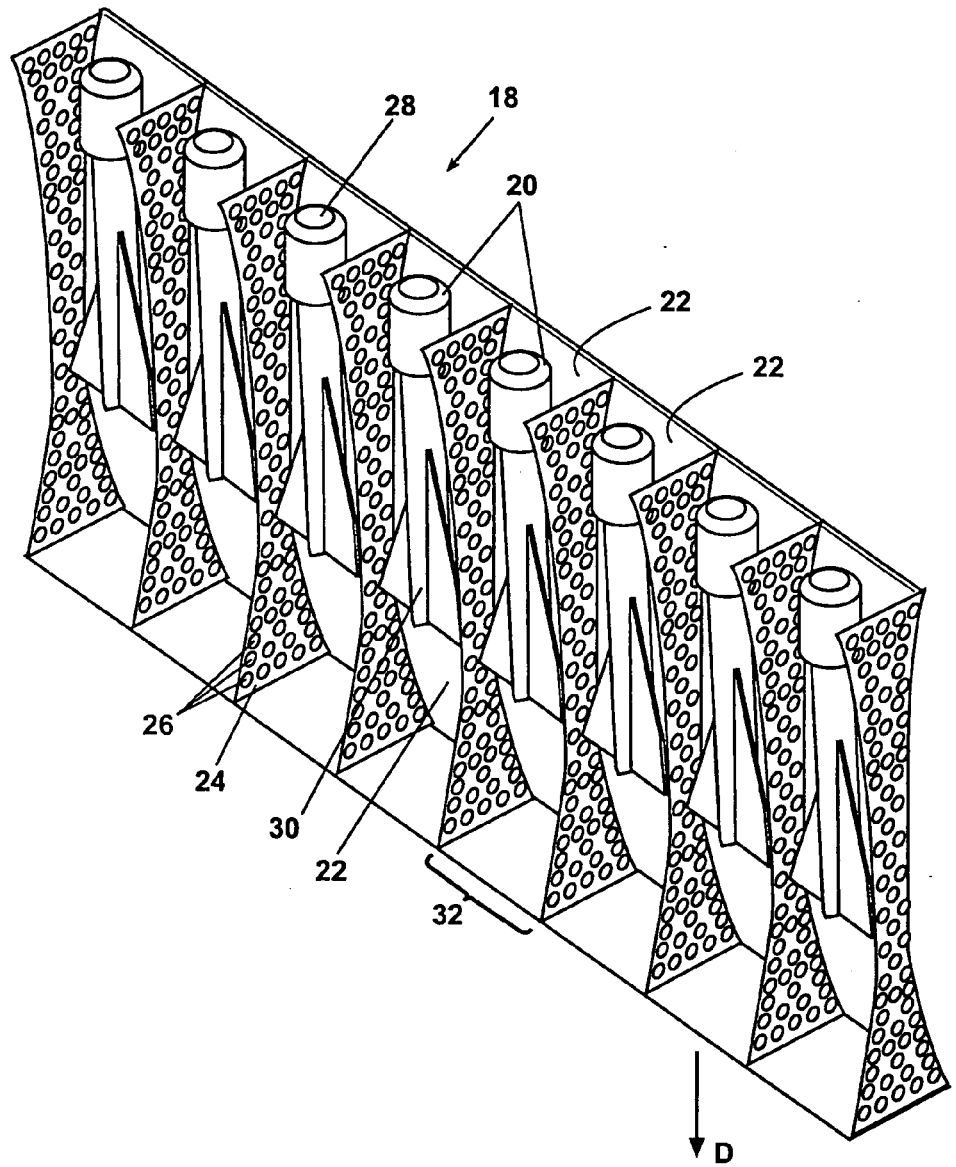
FIG. 2 is a perspective view of a group of pulsejets of FIG. 1 having ejectors wherein the ejectors are formed as augmentor cells of the present invention.

Referring to FIG. 2, an exemplary pulsejet bank 18 of the present invention is shown. Each pulsejet bank 18 includes a plurality of pulsejets 20. Each pulsejet 20 together with a pair of sidewalls 22 form a structural member. Additional structural members including intercostals and webs interconnecting each pulsejet to the sidewall(s) 22 are not shown for clarity. An outward facing sidewall 22 has been removed from the view of FIG. 2 for clarity. Each sidewall 22 is curved to entrain and direct air together with the pulsejet exhaust to maximize thrust from each of the pulsejets 20 in the thrust direction D shown. A plurality of perforated end plates 24 are connectably attached to the sidewall 22 adjacent to each of the pulsejets 20. Each of the perforated end plates 24 has a plurality of apertures 26 there through. The apertures 26 permit equalization of flow between each of the pulsejet 20 exhaust flows such that a pulsejet 20 within the pulsejet bank 18 which is operating above or below a nominal operating condition is equalized with the remaining pulsejets 20 of the pulsejet bank 18. Air enters each of the pulsejets 20 through a pulsejet inlet 28. The exhaust gas producing thrust from each of the pulsejets 20 is discharged from a pulsejet exhaust 30 in the thrust direction D. Each adjacent pair of perforated end plates 24 connectably joined to opposed sidewalls 22 form each of a plurality of augmentor cells 32. Only one sidewall 22 is shown in FIG. 2 for clarity. Fuel is supplied to each of the pulsejets 20 through a fuel injection system (shown and discussed with reference to FIG. 10).

Figure 3:
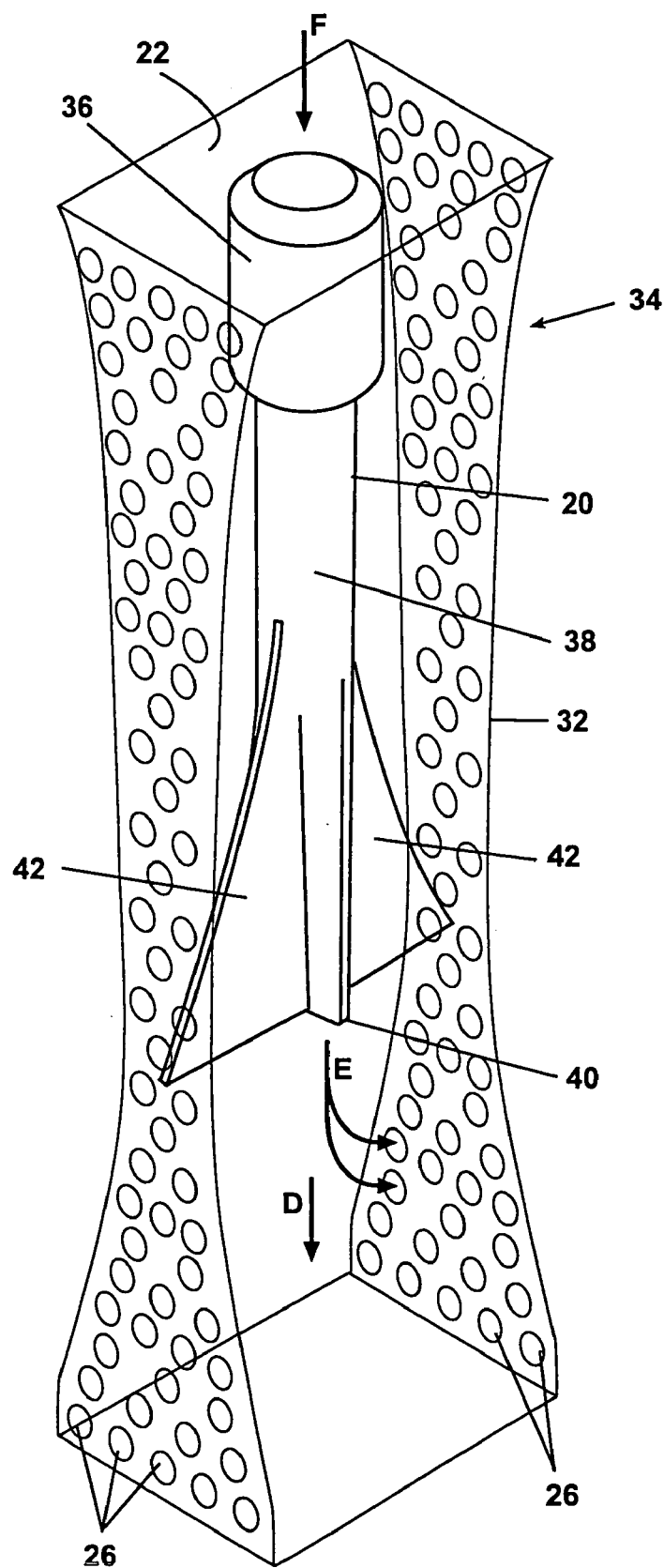
FIG. 3 is an elevation view of a single augmentor cell of the present invention having the pulsejet structurally mounted to the augmentor cell structure.

Referring now to FIG. 3, an exemplary pulsejet bay 34 is detailed. Each pulsejet bay 34 includes one augmentor cell 32 and one pulsejet 20. Each pulsejet 20 includes an inlet diffuser 36, a combustion chamber 38, and a discharge nozzle 40. Structural members join each pulsejet 20 with one or both of the sidewalls 22 to form a unitary load bearing structure. In one preferred embodiment a plurality of fins 42 surround the discharge nozzle 40. The fins 42 are used to structurally interconnect the pulsejet 20 with one or both of the sidewalls 22 of the pulsejet bay 34. In another preferred embodiment, a plurality of webs or intercostals (not shown) join each pulsejet 20 with one or both of the sidewalls 22. Discharge from each of the pulsejets 20 is in the thrust direction D as shown. A portion of the discharge from the pulsejet 20 exits through each of the plurality of apertures 26 in the ejector cross flow direction E. Air enters the inlet diffuser 36 in the air inlet flow direction F. The inlet diffuser 36 is connectably joined to the combustion chamber 38, and the combustion chamber 38 is connectably joined to the discharge nozzle 40. In another preferred embodiment, each of the inlet diffuser 36, the combustion chamber 38, the discharge nozzle 40, and the sidewall(s) 22 can also be provided as an integral unit cast or formed from a single piece of material.

Figure 4:
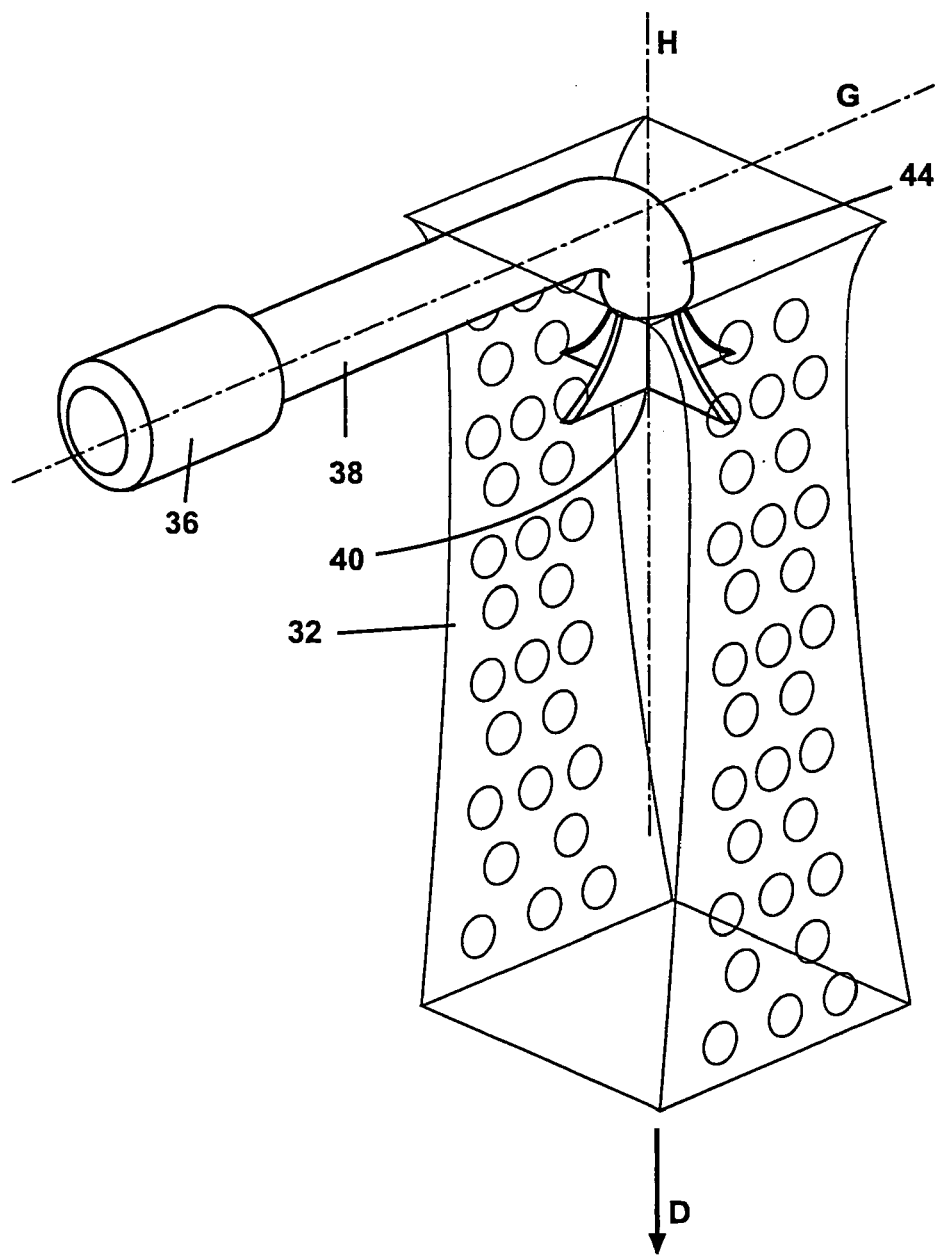
FIG. 4 is an alternate preferred embodiment of the present invention having the pulsejet inlet diffuser and combustion chamber arranged horizontally and the discharge nozzle arranged vertically to discharge downward into an ejector of the present invention.

Referring to FIG. 4, another preferred embodiment of the present invention is shown. In this embodiment, the inlet diffuser 36 and the combustion chamber 38 are co-aligned on a horizontal axis G. A bend 44 connectably joins the combustion chamber 38 to the discharge nozzle 40. The discharge nozzle 40 is aligned along a vertical axis H. The discharge nozzle 40 discharges in the thrust direction D into the augmentor cell 32. This embodiment of the present invention permits the inlet for the pulsejet to be aligned horizontally while the discharge is aligned vertically providing additional flexibility in the arrangement of the pulsejets. A perpendicular alignment between the inlet and the discharge of the pulsejet are shown, however, any angle can be used to suit arrangement constraints while considering engine operability.

Figure 5:
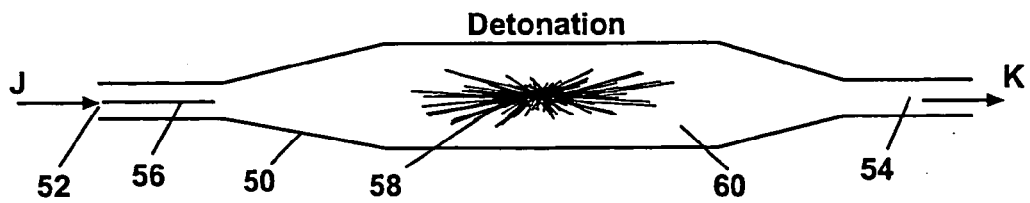
FIG. 5 is a sectioned elevation view of a pulsejet known in the art.

FIGS. 5 through 9 depict a complete operating cycle for a pulsejet engine known in the art. Referring to FIG. 5, a pulsejet 50 known in the art is detailed. The pulsejet 50 includes an inlet diffuser 52 which receives air in the inlet flow direction J. An exhaust nozzle 54 discharges flow from the pulsejet 50 in the exhaust flow direction K. A mechanical valve 56 is included in the inlet diffuser 52 to prevent a backflow of detonated gas from back flowing into the inlet diffuser 52. In FIG. 5, a detonation stage of a fuel/air mixture 58 in a combustion chamber 60 is shown.

Figure 6:
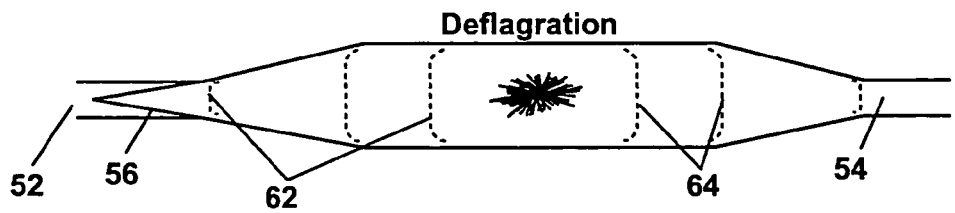
FIG. 6 is the sectioned elevation view of FIG. 5 further showing pressure waves closing a mechanical valve and providing discharge thrust.

Referring to FIG. 6, after the fuel/air mixture 58 of FIG. 5 detonates in the combustion chamber 60, a plurality of reverse pressure waves 62 are generated in a deflagration stage. The reverse pressure waves 62 and the resultant combustion gas travel toward the inlet diffuser 52 and cause the mechanical valve 56 to close preventing flow of the gas through the inlet diffuser 52. A plurality of forward pressure waves 64 is also generated during the deflagration stage. The forward pressure waves 64 and combustion gas travel in the direction of the exhaust nozzle 54 generating thrust from the pulsejet.

Figure 7:
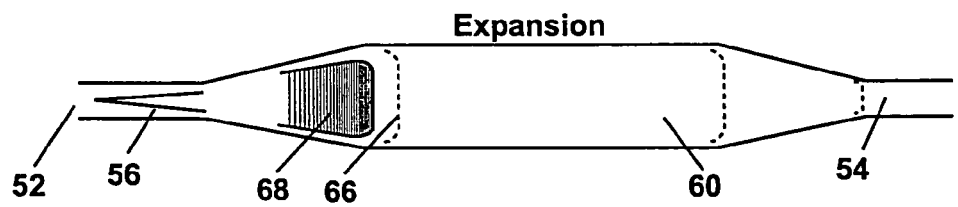
FIG. 7 is the sectioned elevation view of FIG. 6 further showing the partial opening of the mechanical valve and inflow of a fuel/air mixture into the combustion chamber.

Referring to FIG. 7, after a majority of the combustion gas exhausts through the exhaust nozzle 54, the pressure in the combustion chamber 60 reduces due to reflected expansion waves. The reflected expansion waves create a differential pressure gradient across inlet diffuser 52 to the combustion chamber 60 which force the mechanical valve 56 to begin to open. As the mechanical valve 56 opens a new supply of air and fuel enters the combustion chamber 60. A plurality of expanding air pressure waves 66 create low pressure regions that lead a fuel/air mixture 68 into the combustion chamber 60.

Figure 8:
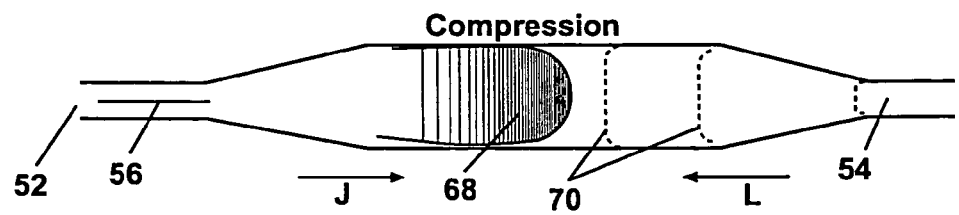
FIG. 8 is the sectioned elevation view of FIG. 7 further showing a fully opened mechanical valve and a fuel/air mixture compression cycle.

Referring to FIG. 8, in a compression stage compression of the fuel/air mixture 68 begins to occur in the combustion chamber 60. The mechanical valve 56 is fully open allowing air flow through the inlet diffuser 52 in the inlet flow direction J. A plurality of high temperature discharge nozzle backpressure waves 70 reflect from the exhaust nozzle 54. The discharge nozzle backpressure wave 70 temperature is approximately 1,500 degrees Fahrenheit (815° C.). The discharge nozzle backpressure waves 70 travel in the nozzle backpressure direction L. When the discharge nozzle backpressure waves 70 contact the fuel/air mixture 68 the fuel/air mixture 68 initially compresses in the combustion chamber 60.

Figure 9:
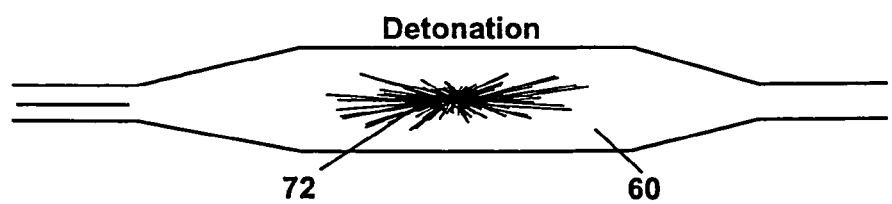
FIG. 9 is the sectioned elevation view of FIG. 8 further showing a fuel/air mixture detonation following a collision between the fuel/air mixture with reflected backpressure waves from a previous detonation.

Referring to FIG. 9, when the high temperature discharge nozzle backpressure waves 70 contact the fuel/air mixture 68 (shown in FIG. 8) and the fuel/air mixture 68 temperature rises to its ignition temperature a detonation of the fuel/air mixture 68 occurs in the combustion chamber 60. The fuel/air mixture 68 detonates at a fuel/air detonation point 72 and a new cycle for the pulsejet 50 begins. The detonation, exhaust, compression and new detonation cycle occurs rapidly in the pulsejet engine, i.e., approximately 60 to 100 cycles per second as is known in the art. Fuel is either continuously pressurized and fed by a fuel injection system (shown and discussed in reference to FIG. 10) or is pulse pressurized to enter at the optimum time of each engine operating cycle. Detonation is normally initiated and can also be controlled using a detonation device (not shown) such as a spark plug in the combustion chamber.

Figure 10:
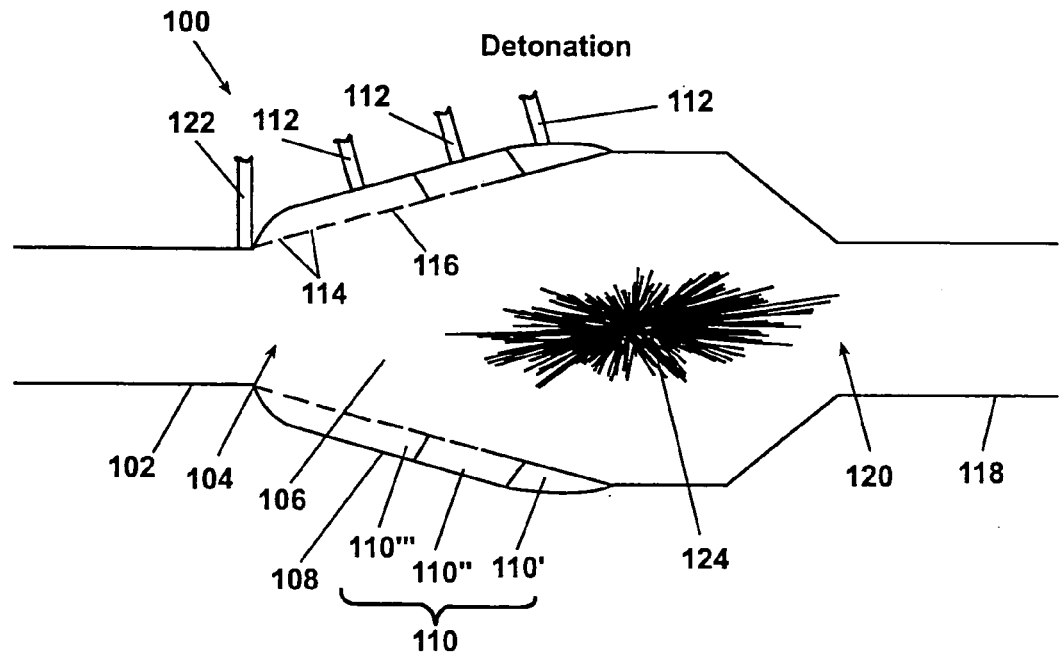
FIG. 10 is a sectioned elevation view of a preferred embodiment of a pulsejet engine of the present invention during a detonation cycle.

FIGS. 10 through 13 show a single cycle of operation of a pulsejet of the present invention. Referring to FIG. 10, a pulsejet 100 of the present invention is shown. The pulsejet 100 includes an inlet diffuser 102 connected to an upstream inlet port 104 of a combustion chamber 106. The combustion chamber 106 is enveloped by a boundary layer air plenum 108. The boundary layer air plenum 108 provides a plurality of boundary layer air ports 110 (designated as exemplary boundary layer air ports 110', 110", and 110'") for introduction of a boundary layer air supply (not shown) through supply lines 112. Boundary layer air is provided by an external source (not shown) which can include compressed air, oxygen generating candles, or bleed air. Boundary layer air enters the combustion chamber 106 through a plurality of apertures 114 in a body section 116 (shown in an exemplary conical shape) of the combustion chamber 106. The apertures 114 in the body section 116 can have the same aperture size, or can increase or decrease in size, as viewed in FIG. 10 from right to left as the apertures 114 are positioned along the body section 116. The body section 116 and the combustion chamber 106 can also be provided in other geometric shapes. One or more boundary layer air ports 110 can be used.

The combustion chamber 106 tapers down and connects to a discharge nozzle 118 at a downstream exit port 120. A fuel supply (not shown) is fed or injected into the inlet diffuser 102 upstream of the upstream inlet port 104 through one or more fuel supply lines 122. Fuel supply lines 122 can also enter the combustion chamber 106, or divide between both the upstream inlet port 104 and the combustion chamber 106. A detonation stage is depicted in FIG. 10. A fuel and air mixture detonates in the combustion chamber 106 at a fuel/air detonation point 124.

Figure 11:
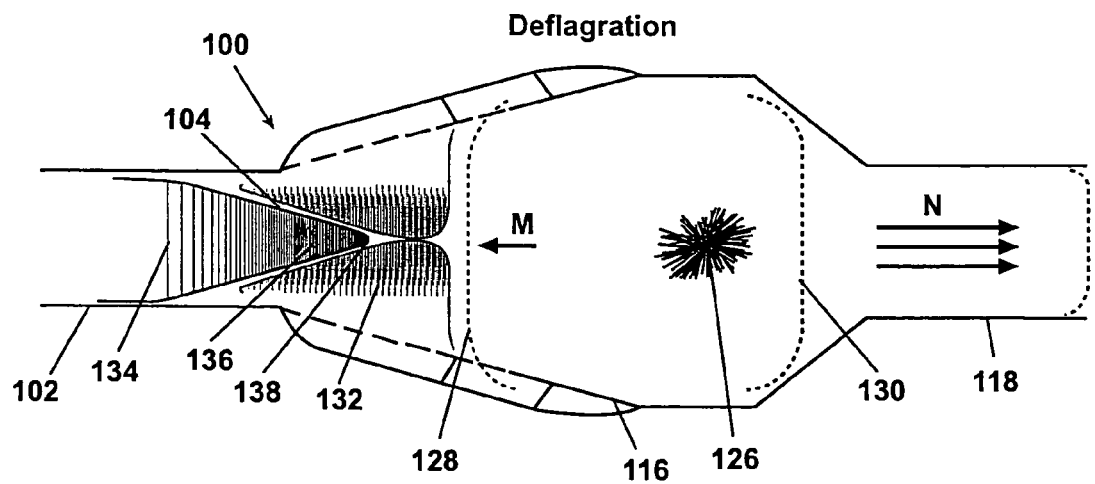
FIG. 11 is the sectioned elevation view of FIG. 10 further showing the deflagration step following detonation wherein the air and fuel flow are choked off by a pressure wave generated during the detonation phase.

Referring to FIG. 11, following the detonation stage shown in FIG. 10, a deflagration stage of the pulsejet 100 is shown. A fuel/air deflagration mixture 126 is shown. As the fuel/air mixture continues to burn and expand beyond the fuel/air deflagration mixture 126, a plurality of reverse pressure waves 128 form. The reverse pressure waves 128 travel in the reverse pressure wave direction M toward the inlet diffuser 102 (shown in FIG. 10). A plurality of forward pressure waves 130 also form. The forward pressure waves 130 travel in the thrust direction N into the discharge nozzle 118. The reverse pressure waves 128 contact an entering boundary layer air volume 132 and compress the boundary layer air volume 132 in the direction of the inlet diffuser 102.

A fresh air stream 134 combines with fuel supplied through the fuel supply line 122 (shown in FIG. 10) to form a fuel/air mixture 136. The boundary layer air volume 132 contacts the fuel/air mixture 136 and a choke point 138 is formed. At the choke point 138, the pressure of the now compressed boundary layer air volume 132 equals or exceeds the pressure of the fresh air stream 134 and further flow of the fresh air stream 134 into the combustion chamber 106 is temporarily blocked. The pressure of the boundary layer air volume 132 driven by the reverse pressure waves 128 also exceeds the pressure of the fuel injection system (not shown) at the fuel supply line 122, or a sensor of the fuel injection system signals a fuel cut-off therefore preventing input of fuel during the deflagration stage.

High pressure within the combustion chamber 106 still exists at the stage where the choke point 138 is created. The pressure in the combustion chamber 106 is relieved as thrust in the thrust direction N as the forward pressure waves 130 travel toward the discharge nozzle 118. The high pressure of the reverse pressure waves 128 force more and more of the boundary layer airflow injected through the boundary layer air plenum 108 (shown in FIG. 10) away from the discharge nozzle facing end of the boundary layer air plenum 108 towards the inlet diffuser facing end. Boundary layer air flow is constricted to flow through an increasingly smaller injection area which causes the velocity and subsequent penetration of the boundary layer air flow into the fresh air stream 134 to increase. In effect, this creates a pneumatic throat or venturi which not only chokes the fresh air stream 134 from entering the pulsejet 100, but also prevents combustion byproducts from exiting the engine via the inlet diffuser 102 (shown in FIG. 10). The choke point 138 location is determined in part by the shape of the body section 116 of the combustion chamber 106, and by the pressure of the reverse pressure waves 128.

Figure 12:
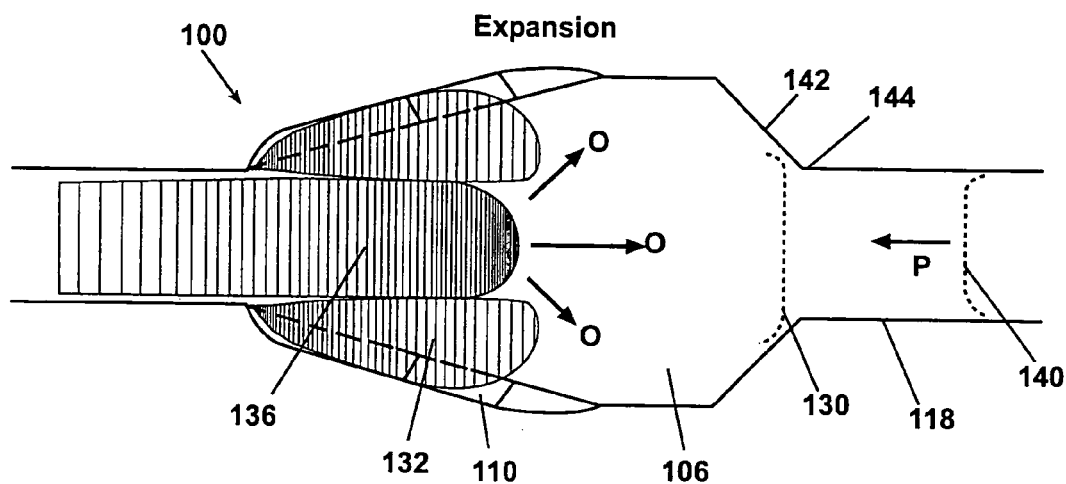
FIG. 12 is the sectioned elevation view of FIG. 11 further showing the expansion of a fuel/air fuel mixture into the combustion chamber of a pulsejet engine of the present invention following thrust exhaust of the previously detonated air fuel mixture.

Referring now to FIG. 12, during an expansion stage the deflagration pressure and its effect on the boundary layer air volume 132 is reduced by thrust discharge through the discharge nozzle 118 and back reflection of the reverse pressure waves 128 from the choke point 138 (identified in FIG. 11). The reverse pressure waves 128, traveling in the direction P encounter the choked flow, reflect and travel in the direction of expansion direction arrows O. This reflection, together with the forward pressure waves 130 exiting the combustion chamber 106, create a diffusion process which subsequently decreases the pressure in the combustion chamber 106. The pressure differential between the fuel/air mixture 136 and the pressure in the combustion chamber 106 causes the fuel/air mixture 136 to flow again into the combustion chamber 106 in the direction of expansion arrows O.

The reduced pressure in the combustion chamber 106 also allows the boundary layer air volume 132 to redistribute itself throughout the boundary layer air plenum 108 (described in reference to FIG. 10) and the combustion chamber 106 from the boundary layer air ports 110. As the boundary layer air flow is redistributed, it is allowed to pass through an ever increasing passage porosity (i.e., the injection area increases). With constant injection pressure and airflow, an increased area necessitates lower velocity injection due to fundamental gas laws. A lowered combustion chamber pressure and increased fresh air charge also help guide the boundary layer air flow to the outer combustor walls of the body section 116. This serves to partially cool and isolate the hot combustor section from the inlet and also stabilizes subsequent combustion processes by focusing the combustion processes to the fuel/air detonation point 124 (shown in FIG. 10). In this expansion stage, the forward pressure waves 130 have reached the discharge nozzle 118. A plurality of discharge nozzle back-pressure waves 140 in the form of rarefaction waves begin to form in this stage. The discharge nozzle back-pressure waves 140 create a sub-ambient expansion which partially induces ejector airflow and combustion byproducts from the last cycle into the discharge nozzle 118. The discharge nozzle back-pressure waves 140 also travel in the direction P.

Figure 13:
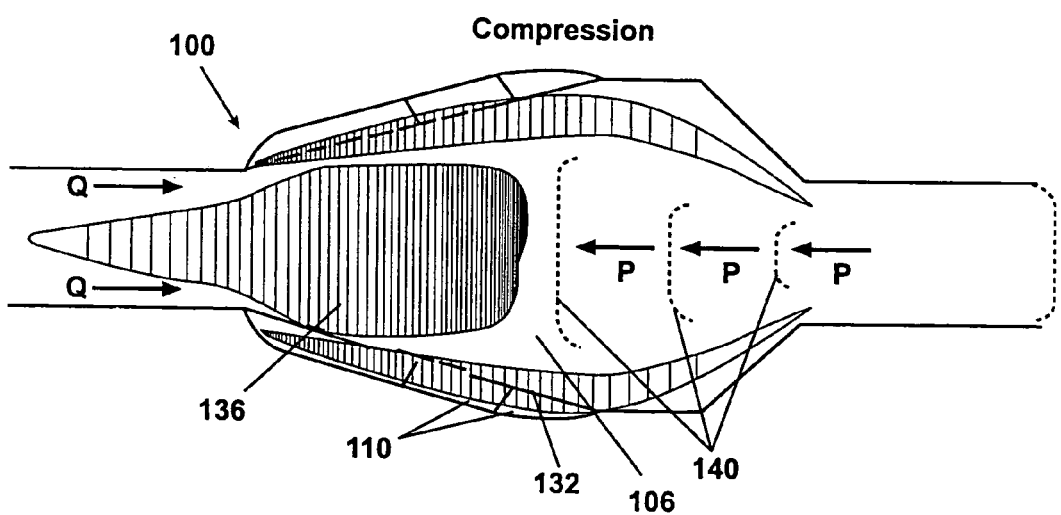
FIG. 13 is the sectioned elevation view of FIG. 12 further showing the fuel/air mixture in the combustion chamber colliding with reflected pressure waves from the discharge nozzle of the pulsejet of the present invention prior to detonation of the air fuel mixture.

Referring now to FIG. 13, in a compression stage the fuel/air mixture 136 traveling in an air/fuel flow direction Q begins to contact the discharge nozzle back-pressure waves 140. The fuel/air mixture 136 begins to compress in the combustion chamber 106. A stabilizing volume of the previously expanded boundary layer air volume 132 is shown as it compresses along the perimeter of the combustion chamber 106. The compression stage shown in FIG. 13 shows the plurality of discharge nozzle back-pressure waves 140 immediately before detonation of the fuel/air mixture 136 similar to the detonation shown in FIG. 10. Detonation begins a new cycle for the pulsejet.

Referring back to FIG. 12, the combustion chamber 106 includes a taper section 142. The taper section 142 ends at a taper distal end 144 which is the connecting point for the discharge nozzle 118. The geometry of the taper section 142 helps provide the constriction of the out flowing gases and the generation of the discharge nozzle back-pressure waves 140.

Figure 14:
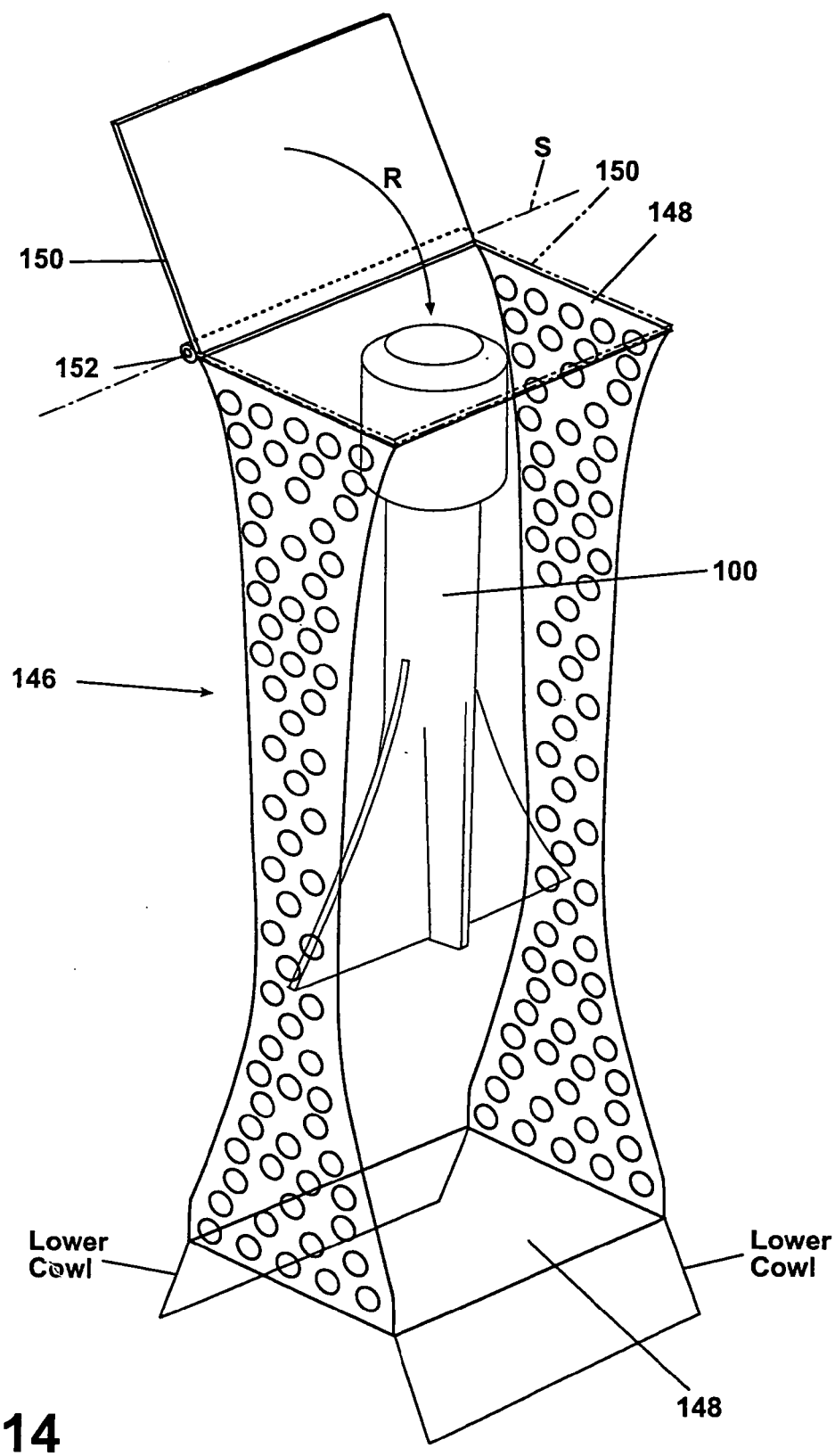
FIG. 14 is the sectioned elevation view of FIG. 3 further showing a rotatable cowl at an inlet aperture of the pulsejet of the present invention.

Referring to FIG. 14, an exemplary pulsejet bay 146 in accordance with a preferred embodiment of the present invention is shown. An upper aperture 148 of the pulsejet bay 146 can be partially or completely closed by a cowl 150. In the exemplary embodiment shown, the cowl 150 is mounted to the pulsejet bay 146 by a hinge 152 or similar mechanical element. The cowl 150 rotates along an arc R about a hinge center-line S to the closed, phantom position shown. The cowl 150 is controlled by a control system (not shown). Air inlet flow to the pulsejet 100 in the pulsejet bay 146 can be controlled by the single cowl 150 shown or by two or more cowls (not shown) similar to the cowl 150. Similar devices provided at the bottom aperture 148 of each of the pulsejet bays 146 can be used to control the thrust produced in each pulsejet bay 146. In another preferred embodiment, the cowl 150 is provided as a flexible member which rolls out from a reel (not shown) which replaces the hinge 152, to the closed, phantom position shown.

The description of the invention is merely exemplary in nature and, thus, variations that do not depart from the gist of the invention are intended to be within the scope of the invention. For example, the exhaust end 16 of the pulsejet engine 10 is shown having a cruciform shape. The exhaust end 16 can also be round, tapered/conical, or shaped to easily be structurally integrated with surrounding structure. Such variations are not to be regarded as a departure from the spirit and scope of the invention.

What is claimed is:

1. A method to operate a pulsejet comprising:
    forming a pulsejet having an upstream inlet diffuser, a combustion chamber, a plurality of boundary layer air ports enveloping said combustion chamber, and a downstream discharge nozzle;
    directing a fresh air supply into said upstream inlet diffuser;
    feeding a fuel into said pulsejet through said inlet diffuser;
    routing a boundary layer air into said plurality of boundary layer air ports;
    mixing said fresh air supply and said fuel in said combustion chamber into a combustion mixture;
    detonating said combustion mixture in said combustion chamber;
    temporarily choking off said fresh air supply at said upstream inlet port with a reverse pressure wave from said detonation; and
    increasing a discharge thrust from said pulsejet through an ejector.

2. The method of claim 1, further comprising shaping the discharge nozzle to deflect a pressure wave from said discharge nozzle back to said combustion chamber to act as a subsequent detonation ignition source.

3. The method of claim 2, further comprising disposing a plurality of said pulsejets in at least one side-by-side configuration.

4. The method of claim 3, further comprising disposing each said pulsejet in one of said ejectors.

5. The method of claim 4, further comprising disposing a plurality of apertures in each of said ejectors.

6. The method of claim 5, further comprising balancing said discharge thrust from each of said plurality of pulsejets using said apertures in each of said ejectors.

7. A method for generating thrust comprising:
  directing a supply of fresh air through an inlet into a combustion chamber;
  feeding a fuel into the combustion chamber at a point adjacent said inlet;
  routing a boundary layer of air into said combustion chamber;
  mixing said fresh air and said fuel into a combustible fuel/air mixture within said combustion chamber;
  detonating said combustion mixture;
  using reverse pressure waves created by said detonation in connection with said boundary layer of air to create a choke point within said combustion chamber adjacent said inlet; and
  discharging forward, thrust generating pressure waves out of said combustion chamber through a discharge port.

8. The method of claim 7, further comprising reflecting said reverse pressure waves from an internal wall surface of said combustion chamber to create a low pressure area adjacent said inlet, thus enabling additional fuel and additional fresh air to be drawn into said combustion chamber.

9. The method of claim 7, further comprising using an internal wall portion adjacent said discharge port to form a plurality of discharge port back-pressure waves that are directed to said inlet.

10. The method of claim 9, further comprising using the discharge back-pressure waves to create a sub-ambient expansion within said combustion chamber that facilitates movement of combustion byproducts toward said discharge port.

11. The method of claim 7, wherein a compression stage is formed for said fuel/air mixture when said back pressure waves contact said air/fuel mixture.

12. The method of claim 11, further comprising compressing a portion of said boundary layer of air along an interior wall area of said combustion chamber as said back pressure waves contact said air/fuel mixture.

13. The method of claim 11, further comprising controllably interrupting the flow of said fresh air into combustion chamber.

14. A method for generating thrust comprising:
  controlling a supply of fresh air through an inlet nozzle into a combustion chamber;
  feeding a fuel into the combustion chamber at a point adjacent said inlet;
  routing a boundary layer of air into said combustion chamber at a point downstream of said inlet nozzle;
  mixing said fresh air and said fuel into a combustible fuel/air mixture within said combustion chamber;
  detonating said combustion mixture;
  using reverse pressure waves created by said detonation in connection with said boundary layer of air to create a choke point within said combustion chamber adjacent said inlet;
  discharging forward, thrust generating pressure waves out of said combustion chamber through a discharge port; and
  reflecting said reverse pressure waves from an internal wall surface of said combustion chamber to create a low pressure area adjacent said inlet nozzle, thus enabling additional fuel and additional fresh air to be drawn into said combustion chamber.

15. The method of claim 14, further comprising using an internal wall portion adjacent said discharge port to form a plurality of discharge port back-pressure waves that are directed to said inlet nozzle.

16. The method of claim 15, further comprising using the discharge port back-pressure waves to create a sub-ambient expansion within said combustion chamber that facilitates movement of combustion byproducts toward said discharge port prior to a subsequent combustion cycle occurring.

17. The method of claim 14, further comprising using said reverse pressure waves to contact said air/fuel mixture and to assist in compressing said air/fuel mixture stage for a subsequent combustion cycle.

18. The method of claim 14, further comprising compressing a portion of said boundary layer of air along an interior wall area of said combustion chamber as discharge port back pressure waves contact said air/fuel mixture, to help partially cool said walls of said combustion chamber.

19. The method of claim 14, further comprising modulating the intake of said fresh air through said inlet nozzle.

20. The method of claim 19 wherein the step of modulating the flow of said fresh air into said inlet nozzle comprises using a valve that controllably blocks a flow of fresh air into the inlet nozzle.

* * * * *